United States Patent [19]

Nagashima

[11] Patent Number: 4,478,239

[45] Date of Patent: Oct. 23, 1984

[54] FUEL TANK LID

[76] Inventor: Akira Nagashima, 1-12, Higashimonzen-2-chome, Kawasaki-ku, Kawasaki-shi, Japan

[21] Appl. No.: 418,154

[22] Filed: Sep. 15, 1982

[30] Foreign Application Priority Data

Jul. 7, 1981 [JP] Japan .......................... 56-100231[U]

[51] Int. Cl.³ .............................................. B65D 83/14
[52] U.S. Cl. .................. 137/209; 222/400.7; 222/400.8
[58] Field of Search ..................... 137/209; 222/400.8, 222/400.7

[56] References Cited

U.S. PATENT DOCUMENTS

| 1,245,165 | 11/1917 | Tharp | 137/209 |
| 1,559,741 | 11/1925 | Cross | 137/209 |
| 2,060,512 | 11/1936 | Magill | 222/400.8 |
| 2,151,043 | 3/1979 | Paton | 137/209 X |
| 2,680,477 | 6/1954 | Schira | 137/209 X |
| 3,127,070 | 3/1964 | Brickman | 222/400.8 X |
| 3,207,387 | 9/1965 | Brickman | 222/400.8 |
| 3,275,305 | 9/1966 | Nutten | 261/34 |

FOREIGN PATENT DOCUMENTS 56-29213  7/1981  Japan.

Primary Examiner—Alan Cohan

[57] ABSTRACT

A fuel tank lid having an inner lid and provided with an internal cavity which slidably receives a piston. The piston is provided at its upper end portion with a filter and a suction vent valve through which the internal cavity of the lid is communicated with the exterior of the tank. The inner lid is provided at its both with a discharge vent valve through which the internal cavity is communicated with the interior of the tank. The piston has an upper end portion exposed to the outside, and is normally biased outwardly by a spring. This tank lid functions as an air pressurizing pump for pressurizing the air in the tank, as the piston is manually operated reciprocatingly.

2 Claims, 1 Drawing Figure

U.S. Patent    Oct. 23, 1984    4,478,239
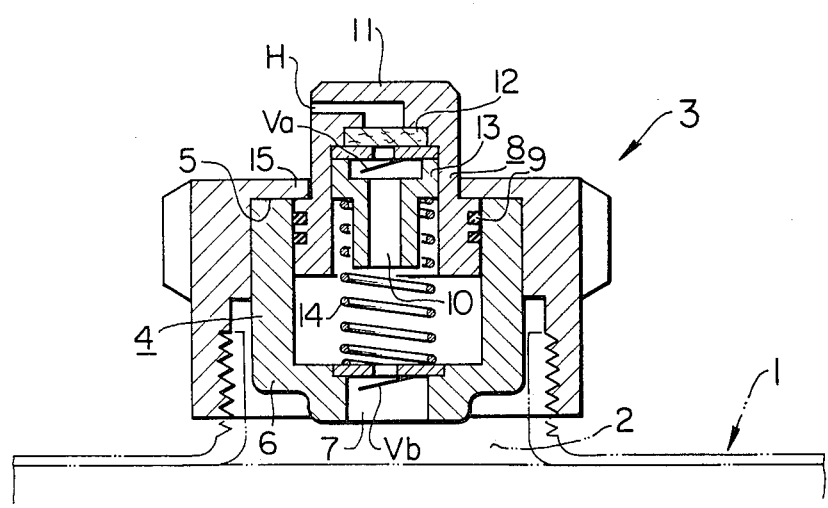

FUEL TANK LID

BACKGROUND OF THE INVENTION

The present invention relates to a fuel tank lid effective as means for improving the start up characteristic or assisting the start up under a condition of fuel shortage in small-sized internal combustion engines for various machines.

Various attempts have been made with carburetors for improving the start up characteristic of the engine of the kind mentioned above. Typical example of such attempts is to provide an auxiliary device for pressurizing the fuel in the float chamber or fuel chamber by means of, for instance, a tickler or a manual pump connected to the fuel supply side of the carburetor.

These attempts, however, are still unsatisfactory and there is an increasing demand for a device which can improve the start up characteristic of the engine and can assist the engine when the latter is started under a condition of fuel shortage.

BRIEF SUMMARY OF THE INVENTION

Accordingly, an object of the invention is to provide a fuel tank lid which can cope with the above-mentioned demand.

To this end, according to the invention, there is provided a fuel tank lid comprising a manually operable air pressurizing pump for pressurizing the air in a fuel tank thereby to improve the start up characteristic or to eliminate any trouble due to shortage of fuel in a small-sized internal combustion engine for driving machines for various works.

More specifically, according to the invention, there is provided a fuel tank lid of the type mentioned above, wherein the air pressurizing pump includes an inner lid, a discharge vent valve fitting to a discharge vent hole formed in the bottom of the inner lid, a piston slidably received by an internal cavity formed in the inner lid and having an internal cavity communicated with the internal cavity of the inner lid, the piston having an end projecting to the outside of the tank lid, the internal cavity in the piston being communicated with the exterior of the tank through a filter and a suction vent valve which disposed in the externally projected portion of the piston.

According to the invention, since the fuel pressurized in the tank is supplied to the carburetor, it is possible to force out any bubble of air in the minute passage in the carburetor and to fill up the portions of the carburetor which are difficult to be filled up, regardless of whether the carburetor is of a float type or a diaphragm type. Thus, according to the invention, it is possible to eliminate any suspension of fuel supply or lack of fuel, and the carburetor can be sufficiently charged up with the fuel to ensure a safe and smooth start up of the engine without suffering any discontinuity of fuel supply or lack of fuel.

When the engine operates at a high speed or under heavy load, it is possible to supply the fuel at a rate which is much greater than that obtained by the normal setting of the carburetor to avoid various troubles attributable to shortage of fuel such as undesirable reduction of output power, excesive rise of the combustion temperature and so forth.

The fuel tank lid of the invention can provide a rather continuous and automatic fuel boosting effect, unlike the conventional means such as tickler or manually operable pump which can provide the boosting effect only temporarily.

Furthermore, the fuel tank lid of the invention can easily be substituted for the tank lid of any existing engine, so that the advantageous effect of the invention, i.e. the safe and smooth start up and operation of the engine, can be achieved also with existing engines.

The above and other objects, features and advantages of the invention will become clear from the following description of the preferred embodiments of the invention taken in conjunction with accompanying drawing.

BRIEF DESCRIPTION OF THE DRAWING

The attached sole FIGURE shows a fuel tank lid constructed in accordance with an embodiment of the invention.

DESCRIPTION OF THE PREFERRED EMBODIMENT

A detailed description will be made hereinunder with specific reference to the accompanying drawing.

A fuel tank 1 has a fuel pouring port 2 to which screwed is a lid 3. An inner lid 4 fits in the lid 3 in close contact with the ceiling 5 of the lid 3. The inner lid 4 is provided at its bottom 6 with a central hole 7 which is adapted to be selectively opened and closed by a discharge vent valve Vb. The inner lid 4 has an internal bore which slidably receives a piston 8 provided on its peripheral with sealing rings 9. The piston 8 has an internal cavity 10 which is in communication with the space in the inner lid 4. The upper end of the piston 8 projects upward through the ceiling 5 of the lid 3 to provide a projection 11. A vent hole H formed in the projection 11 provides a communication between the internal cavity 10 and the exterior of the tank 1. An assembly consisting of a suction vent valve Va and a filter 12 superposed to the valve Va is positioned in contact with the ceiling of the piston 8. The assembly is pressed against the ceiling of the piston 8 by a piston spring retainer 13 which is urged outwardly by a piston spring 14 which acts on its other end on the discharge vent valve Vb to hold the same. The upward movement of the piston 8 is limited by a shoulder 15 formed around the opening in the ceiling 5 of the lid 3. Thus, the piston 8 can be moved up and down as the projection 11 is pressed. The lid 3 provides, as a result of the up and downward movement of the piston 8, a pumping effect for pressurizing the air in the tank 1. Namely, as the projection 11 is pressed down, the air confined in the cavity 10 is compressed by the downward movement of the piston 8 and the pressurized air is charged into the tank 1 forcibly opening the discharge vent valve Vb. In the returning, i.e. upward, stroke of the projection 11 caused by the piston spring 14, the suction vent valve Va is opened to permit the ambient air to be introduced into the cavity 10. Thus, the air pressure in the tank 1 is increased as a result of operation of the tank lid 3 of the invention. No leakage takes place because both vent valves Va and Vb are kept closed when the tank lid 3 is not operated.

What is claimed is:

1. A fuel tank lid comprising a manually operable air pressurizing pump for pressurizing the air in a fuel tank thereby to improve the start up characteristic or to eliminate any trouble due to shortage of fuel in a small-sized internal combustion engine for driving machines for various works, said air pressurizing pump including an inner lid, a discharge vent valve fitting to a discharge vent hole formed in the bottom of said inner lid, and a piston slidably received in an internal cavity of said inner lid, said piston having an end projecting to the outside of the tank lid and an internal cavity being communicated with the exterior of said tank through a filter and a suction vent valve which are secured in said piston by a piston spring.

2. A fuel tank lid for both closing a fuel inlet port to a fuel tank and for manually air pressurizing the fuel tank, said fuel tank lid comprising an external annular component having a top and a bottom and means along the bottom for interconnecting to the fuel inlet port of the fuel tank;

an annular inner lid generally concentric to and fitting within and fixed to said external annular component, said annular inner lid having a first opening at its upper end and a second opening at its lower end, said annular inner lid further having an internal surface at least a portion of which is adapted to act as a piston cylinder;

an axially slidable piston lying within said annular inner lid and having an air inlet opening at its upper end and an air outlet opening at its lower end, said piston having an outer surface at least a portion of which lies in air sealing relationship with the portion of the internal surface of said annular inner lid acting as a piston cylinder;

means to bias said piston in an upper position so that a portion of said cylinder extends above the top of said external annular component;

a first one-way vent valve within said piston permitting air flow through the piston air inlet into the interior of said annular inner lid, and a second one-way vent valve in the vicinity of the second opening of said annular inner lid at the lower end thereof permitting air flow out of the interior of said annular inner lid; and whereby said vent valves, said piston and said annular inner lid cooperate to form manually operable air pressurizing pump means for pressurizing the air in the fuel tank to thereby improve start up characteristic or to eliminate any trouble due to shortage of fuel in a small-sized internal combustion engine.

* * * * *

UNITED STATES PATENT AND TRADEMARK OFFICE
CERTIFICATE OF CORRECTION

PATENT NO. : 4,478,239
DATED : October 23, 1984
INVENTOR(S) : Akira NAGASHIMA

It is certified that error appears in the above—identified patent and that said Letters Patent is hereby corrected as shown below:

On the face of the above-identified patent, please add the Assignee as follows:

-- KIORITZ CORPORATION,

Tokyo, Japan --.

On the face of the above-identified patent, please omit [30] Foreign Application Priority Data "Jul. 7, 1981 [JP] Japan 56-100231[U]"

Signed and Sealed this

Fourth Day of June 1985

[SEAL]

Attest:

DONALD J. QUIGG

Attesting Officer     Acting Commissioner of Patents and Trademarks